US010239231B2

(12) United States Patent
Fujita

(10) Patent No.: US 10,239,231 B2
(45) Date of Patent: Mar. 26, 2019

(54) DIAMETER EXPANSION DRILL BIT

(71) Applicant: FS TECHNICAL CORPORATION, Tokyo (JP)

(72) Inventor: Shogo Fujita, Tokyo (JP)

(73) Assignee: FS TECHNICAL CORPORATION, Tokyo (JP)

(*) Notice: Subject to any disclaimer, the term of this patent is extended or adjusted under 35 U.S.C. 154(b) by 200 days.

(21) Appl. No.: 15/304,277

(22) PCT Filed: Oct. 8, 2015

(86) PCT No.: PCT/JP2015/078687
§ 371 (c)(1),
(2) Date: Oct. 14, 2016

(87) PCT Pub. No.: WO2016/166908
PCT Pub. Date: Oct. 20, 2016

(65) Prior Publication Data
US 2017/0136654 A1 May 18, 2017

(30) Foreign Application Priority Data

Apr. 13, 2015 (JP) ................... 2015-081557

(51) Int. Cl.
B23B 51/00 (2006.01)
B24B 33/02 (2006.01)
(Continued)

(52) U.S. Cl.
CPC .......... B28D 1/146 (2013.01); B23B 51/0045 (2013.01); B24B 5/06 (2013.01);
(Continued)

(58) Field of Classification Search
CPC .......... E21B 10/32; B28D 1/146; B28D 1/18; B23B 2226/75; B23B 2270/04; B23B 51/0045; B24B 33/02
See application file for complete search history.

(56) References Cited

U.S. PATENT DOCUMENTS 4,640,371 A * 2/1987 Moraly ............... B23B 51/0045
175/61
4,976,323 A * 12/1990 Kitchens ............... E21B 10/322
175/267

(Continued)

FOREIGN PATENT DOCUMENTS

JP S55-138055 U 10/1980
JP 2001-129821 A 5/2001
(Continued)

OTHER PUBLICATIONS

Dec. 15, 2015 International Search Report issued in International Patent Application No. PCT/JP2015/078687.
(Continued)

Primary Examiner — Daniel P Stephenson
(74) Attorney, Agent, or Firm — Oliff PLC

(57) ABSTRACT

A diameter expansion drill bit used to expand the diameter of a part of a prepared hole bored in a frame by grinding includes: a cutting-blade portion that has a plurality of separate cutting-blade portions; a cutting-blade holding portion that slidably holds the plurality of separate cutting-blade portions in a radial direction; and a shank portion that supports the cutting-blade holding portion. The plurality of separate cutting-blade portions is arranged in a peripheral direction and arranged over a plurality of stages in a shaft direction, and the plurality of separate cutting-blade portions of the respective stages is caused to slide by a centrifugal force resulting from rotation so as to spread to an outside in (Continued)

the radial direction with respect to the cutting-blade holding portion.

9 Claims, 10 Drawing Sheets

(51) Int. Cl.
*B28D 1/14* (2006.01)
*B24B 5/06* (2006.01)
*B24B 5/40* (2006.01)

(52) U.S. Cl.
CPC ............... *B24B 5/40* (2013.01); *B24B 33/02* (2013.01); *B28D 1/14* (2013.01); *B23B 2226/75* (2013.01); *B23B 2270/04* (2013.01)

(56) References Cited

U.S. PATENT DOCUMENTS

| | | | | |
|---|---|---|---|---|
| 5,528,830 | A | * | 6/1996 | Hansen .................. B23D 21/04 30/101 |
| 9,573,238 | B2 | * | 2/2017 | Fujita ..................... B28D 1/146 |
| 2007/0102195 | A1 | * | 5/2007 | Denoix .................. E21B 10/32 175/91 |
| 2011/0053469 | A1 | * | 3/2011 | McDowell ................ B24B 5/40 451/61 |
| 2012/0070244 | A1 | | 3/2012 | Stern |
| 2012/0083883 | A1 | * | 4/2012 | Ginn .................. A61B 17/1604 623/17.11 |
| 2017/0136654 | A1 | * | 5/2017 | Fujita ..................... B28D 1/146 |

FOREIGN PATENT DOCUMENTS

| | | | |
|---|---|---|---|
| JP | 2005-280243 A | 10/2005 | |
| JP | 2012-148462 A | 8/2012 | |
| WO | WO-2011137494 A1 * | 11/2011 | ......... B23B 51/0045 |
| WO | 2014/129119 A1 | 8/2014 | |

OTHER PUBLICATIONS

Dec. 15, 2015 Written Opinion issued in International Patent Application No. PCT/JP2015/078687.

\* cited by examiner

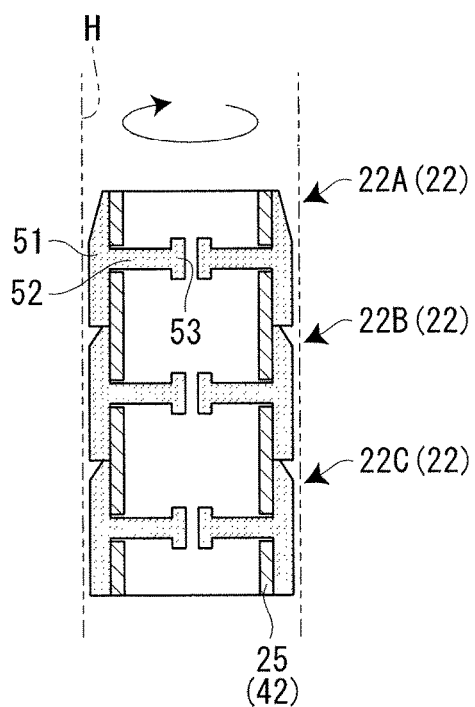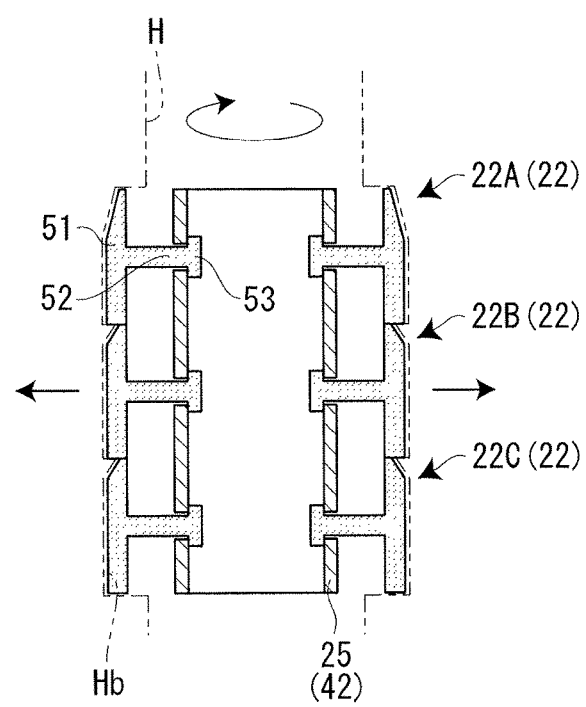
F I G. 7 A　　　　F I G. 7 B

DIAMETER EXPANSION DRILL BIT

TECHNICAL FIELD

The present invention relates mainly to a diameter expansion drill bit used to expand the diameter of a part of a prepared hole bored in a frame such as concrete.

BACKGROUND ART

Conventionally, as such a diameter expansion drill bit, there has been known an undercut drill device that is inserted for use in a straight-shaped prepared hole bored in a frame such as concrete and expands the diameter of the deepest part of the prepared hole (see Patent Document 1).

The undercut drill device has a hollow cylindrical barrel body inserted in a prepared hole, a putting member that is mounted on the opening edge of the prepared hole and rotatably supports the barrel body via a bearing, a shaft that slidably engages with the barrel body on the same axis and integrally rotates with the barrel body, a truncated-cone-shaped cone portion that is provided on the tip-end side of the barrel body and has four guide grooves on its outer peripheral surface, four arms that are attached to the tip end of the shaft and engage with the respective guide grooves, and two cutting blades and two guide portions alternately provided on the tip-end outer surfaces of the four arms.

The cutting blades and the guide portions are positioned inside the barrel body when the shaft is pulled up. When the barrel body and the shaft inserted in the prepared hole are integrally rotated and the shaft is moved downward, the four arms move downward and spread to an outside through the guide grooves of the cone portion. Thus, the cutting blades grind the inner peripheral surface of the prepared hole to form a diameter expansion portion at the bottom part (the deepest part) of the prepared hole.

[Patent Document 1] JP-A-2005-280243

DISCLOSURE OF THE INVENTION

Problems that the Invention is to Solve

Since the above undercut drill device is structured to guide the arms having the cutting blades with the outer peripheral surface of the cone portion, it is required to support the cone portion with the barrel body, which gives rise to the problem that the structure becomes extremely complicated.

In addition, the undercut drill device is configured such that the arms having the cutting blades move downward and spread to the outside through the guide grooves to grind the inner peripheral surface of a prepared hole. Therefore, the shape of a formed diameter expansion portion is naturally restricted.

The present invention has an object of providing a diameter expansion drill bit capable of giving the degree of freedom to the shape of a formed diameter expansion portion with a simple structure.

Means for Solving the Problems

The present invention provides a diameter expansion drill bit inserted for use in a prepared hole bored in a frame and used to expand a diameter of a part of the prepared hole by grinding, the diameter expansion drill bit including: a cutting-blade portion that has a plurality of separate cutting-blade portions used to grind the part of the prepared hole; a cutting-blade holding portion that slidably holds the plurality of separate cutting-blade portions in a radial direction; and a shank portion that supports the cutting-blade holding portion, wherein the plurality of separate cutting-blade portions is arranged in a peripheral direction and arranged over a plurality of stages in a shaft direction, and the plurality of separate cutting-blade portions of the respective stages is caused to slide by a centrifugal force resulting from rotation so as to spread to an outside in the radial direction with respect to the cutting-blade holding portion.

According to the configuration, when the shank portion is rotated in a state of being inserted in a prepared hole, the plurality of separate cutting-blade portions of the respective stages held by the cutting-blade holding portion is caused to slide to the outside in the radial direction by a centrifugal force. That is, the plurality of separate cutting-blade portions rotating with the cutting-blade holding portion is caused by a centrifugal force to slide so as to spread to the outside in the radial direction and grind a prepared hole to expand its diameter. In this case, since each of the separate cutting-blade portions is configured to move by the centrifugal force, the structure can be simplified. In addition, each of the plurality of separate cutting-blade portions of the respective stages is caused to spread by a centrifugal force. Therefore, a diameter expansion portion having any shape in the shaft direction can be formed in such a manner that the movement strokes of the respective stages are set to be the same or different from each other. That is, the degree of freedom can be given to the shape of a formed diameter expansion portion.

In this case, the plurality of separate cutting-blade portions of the respective stages preferably has different movement strokes in the radial direction.

According to the configuration, a diameter expansion portion having a truncated cone shape, a substantially inverted truncated cone shape, a substantially deformed constriction shape, or the like can be freely formed in a prepared hole in such a manner that the movement strokes of the respective stages are appropriately set.

In this case, the movement strokes of the respective stages are preferably set to be longer in stages toward a tip end.

According to the configuration, a diameter expansion portion having a substantially truncated cone shape spreading toward its tip end can be formed in a prepared hole.

In addition, the plurality of separate cutting-blade portions of the respective stages preferably has the same movement stroke in the radial direction.

According to the configuration, a diameter expansion portion having a substantially cylindrical shape can be formed in a prepared hole.

In this case, the cutting-blade holding portion is preferably formed into a shape spreading toward a tip end thereof.

According to the configuration, a diameter expansion portion having a substantially truncated cone shape spreading toward its tip end can be formed in a prepared hole.

In addition, the respective separate cutting-blade portions preferably have a guide portion, which guides pulling of the diameter expansion drill bit from the diameter expansion portion formed in the prepared hole, at an outer peripheral surface on a base-end side thereof.

When the cutting-blade portion (the diameter expansion drill bit) is pulled out from a prepared hole after the formation of a diameter expansion portion, there is a likelihood that the separate cutting-blade portions caused to spread by a centrifugal force interfere with the diameter expansion portion depending on the shape of the diameter expansion portion.

According to the configuration, the separate cutting-blade portions have the guide portion at the outer peripheral surface on the base-end side. Therefore, when the cutting-blade portion is pulled out, the separate cutting-blade portions can be moved to their initial positions via the guide portions. Accordingly, the diameter expansion drill bit can be smoothly pulled out regardless of the shape of a formed diameter expansion portion.

In addition, the cutting-blade holding portion preferably has a spire portion, which protrudes coaxially with the cutting-blade holding portion, at a tip-end thereof, and the spire portion is preferably made of a cemented carbide material.

According to the configuration, a diameter expansion portion can be formed at a prescribed depth position based on the hole bottom of a prepared hole in such a manner that the spire portion is rotated while being pressed against the hole bottom of the prepared hole. In addition, the spire portion is brought into point-contact with the center of a hole bottom. Therefore, friction with the hole bottom and the rotational fluctuations of the cutting-blade portion can be minimized at the rotation. Moreover, the spire portion is made of a cemented carbide material. Therefore, the abrasion of the spire portion can be minimized. Thus, a diameter expansion portion can be constantly formed at a prescribed position away from the hole bottom of a prepared hole.

On the other hand, the cutting-blade holding portion preferably has a plurality of cutting-blade opening portions that slidably holds the plurality of separate cutting-blade portions of the respective stages, and the respective separate cutting-blade portions preferably have a cutting-blade main-body that includes a grinding portion having an arc shape in cross section, a rib portion that supports the cutting-blade main-body and slidably engages with the cutting-blade opening portion in the radial direction, and a coming-off preventing portion that is provided at the rib portion and prevents the rib portion from coming off the cutting-blade opening portion.

According to the configuration, the rib portions of the separate cutting-blade portions caused to move to the outside in the radial direction by a centrifugal force are guided to slide by the cutting-blade opening portions of the cutting-blade holding portion. In this case, since the respective rib portions slidably engage with the cutting-blade opening portions in the radial direction, the cutting-blade main-bodies including the grinding portion move in parallel to the outside in the radial direction. Thus, (a part) of a prepared hole can be efficiently ground. In addition, the movement-end positions of the cutting-blade main-bodies that move to the outside in the radial direction, i.e., the movement strokes of the separate cutting-blade portions can be easily restricted by the coming-off preventing portions.

In addition, the plurality of separate cutting-blade portions of the respective stages is preferably constituted by the two separate cutting-blade portions arranged at positions point-symmetrically by 180°.

According to the configuration, the cutting-blade portions and their surrounding portions can be simplified and miniaturized without degrading cutting performance.

Moreover, the shank portion preferably has a shank main-body that has an intra-shank flow path used to supply a coolant to the cutting-blade portions via the cutting-blade holding portion and a coolant pipe that communicates with the intra-shank flow path and extends from a tip end of the shank main-body to a position corresponding to the plurality of separate cutting-blade portions of a tip-end stage of the cutting-blade holding portion.

According to the configuration, a coolant can be supplied from the tip-end side of the cutting-blade portion (the plurality of separate cutting-blade portions of the tip-end stage) via the cutting-blade holding portion to cool the plurality of separate cutting-blade portions when the coolant is discharged from the coolant pipe. The coolant supplied from the tip-end side of the cutting-blade portion flows toward the opening portion of a prepared hole while cooling the separate cutting-blade portions of the respective stages. Therefore, the cutting-blade portions can be efficiently cooled. In addition, when the coolant is a liquid, the coolant to which a centrifugal force is applied presses the respective separate cutting-blade portions in such a manner as to scatter radially and accelerates the spreading of the respective separate cutting-blade portions.

BRIEF DESCRIPTION OF THE DRAWINGS

FIGS. 7A and 7B are schematic cross-sectional views showing a bit portion and a diameter expansion portion formed by the bit portion in a third embodiment.

DESCRIPTION OF EXEMPLARY EMBODIMENTS

Figure 1:
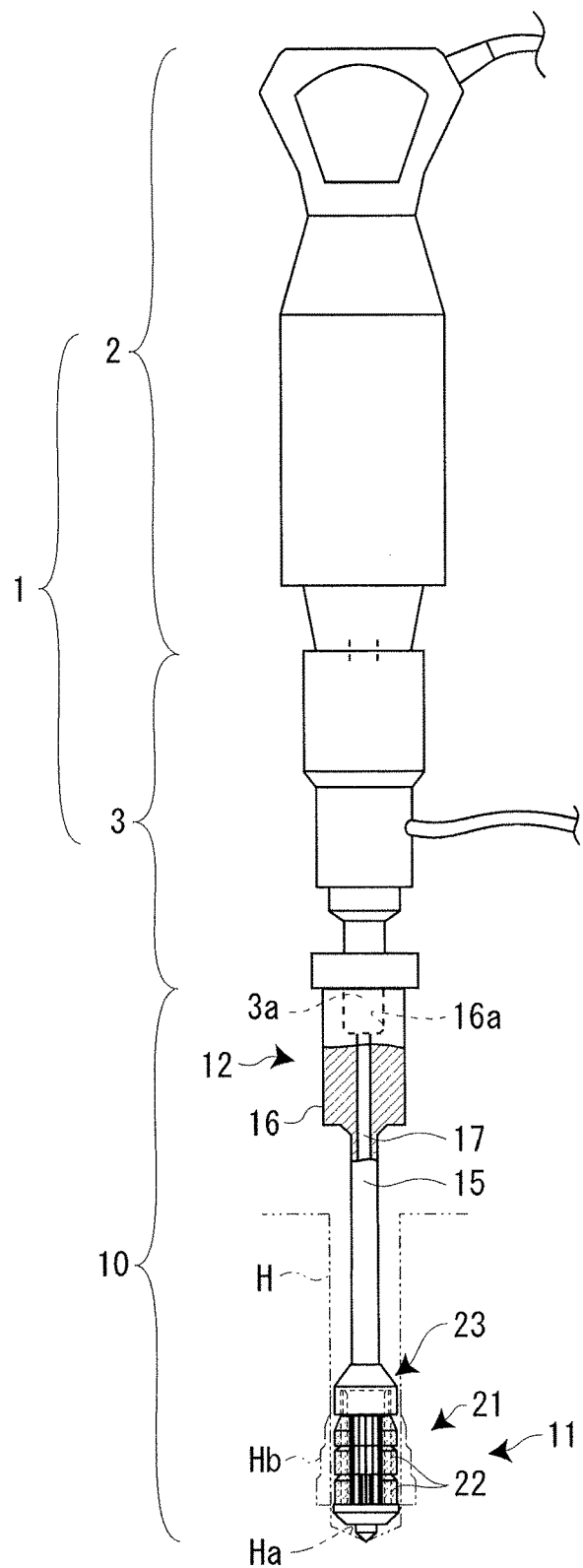
FIG. 1 is an outline view of a diameter expansion device including a diameter expansion drill bit according to an embodiment.

Hereinafter, a description will be given, with reference to the accompanying drawings, of a diameter expansion drill bit according to an embodiment of the present invention. The diameter expansion drill bit is mainly used to expand the diameter of a part of a prepared hole formed in a frame such as concrete or the like to drive a post-installed anchor and capable of enhancing the drawing strength of the driven post-installed anchor. That is, the diameter expansion drill bit is used to form a diameter expansion portion in a part of a prepared hole such that the post-installed anchor driven into the prepared hole has a theoretical wedging effect.

FIG. 1 is an outline view of a diameter expansion device that forms a diameter expansion portion in a prepared hole. As shown in the figure, a diameter expansion device 1 has a hand-held electric drill 2, a cooling-liquid attachment 3 attached to the electric drill 2, and a diameter expansion drill bit 10 attached to the cooling-liquid attachment 3. That is, the diameter expansion drill bit 10 is detachably attached for use to a rotation shaft 3*a* of the cooling-liquid attachment 3 connected to the electric drill 2 constituting a power source.

The rotation shaft 3*a* has a flow path for a cooling liquid. On the other hand, the cooling-liquid attachment 3 is connected to a cooling-liquid supply device not shown, and the cooling liquid is supplied from the cooling-liquid supply device to the tip end of the diameter expansion drill bit 10 via the cooling-liquid attachment 3. Note that a valve for opening/closing the flow path for the cooling liquid is mounted in the cooling-liquid attachment 3 (not shown). The valve is put in an "open" state when the diameter expansion drill bit 10 is bumped against a hole bottom Ha of a prepared hole H and put in a "closed" state when the diameter expansion drill bit 10 is separated from the hole bottom Ha. In addition, the prepared hole H is bored by a vibration drill, a hammer drill, a core bit, or the like.

The diameter expansion drill bit 10 has a bit portion 11 that forms a diameter expansion portion Hb in the prepared hole H and a shank portion 12 that is detachably attached to the rotation shaft 3*a* (the cooling-liquid attachment 3) of the diameter expansion device 1 on its base-end side and supports the bit portion 11 so as to be positioned on the same axis on its tip-end side. In this case, the bit portion 11 is unitized and detachably attached to the tip end of the shank portion 12 by screw joining. In addition, the shank portion 12 is integrally formed by a shank main-body 15 that supports the bit portion 11 and a large-diameter shaft portion 16 attached to the rotation shaft 3*a*.

The shaft portion 16 has a fastening portion 16*a* formed by a female screw at its small cut end. The fastening portion 16*a* is threadedly engaged with the rotation shaft 3*a* of the cooling-liquid attachment 3 formed by a male screw. In addition, the shank portion 12 (the shank main-body 15) has a tip-end male-screw portion 15*a* with which the bit portion 11 is threadedly engaged at its tip end. Moreover, the shank main-body 15 and the shaft portion 16 have an intra-shank flow path 17 for the cooling liquid at their shaft centers. The cooling liquid supplied from the cooling-liquid attachment 3 is supplied to the bit portion 11 via the intra-shank flow path 17.

Note that the above diameter expansion device 1 is a wet type that uses a cooling liquid. However, the diameter expansion device 1 of a dry type that does not use a cooling liquid is also available. Although not particularly shown in the figure, the dry-type diameter expansion device 1 does not have the intra-shank flow path 17 in the shank portion 12 and has the diameter expansion drill bit 10 directly connected to the electric drill 2. In addition, in other dry-type diameter expansion devices 1, compression air or cooling gas is introduced instead of a cooling liquid. Further, the unitized bit portion 11 is used as a common component among the wet-type and the dry-type diameter expansion drill bits 10.

Figures 2A, 2B, 2C:
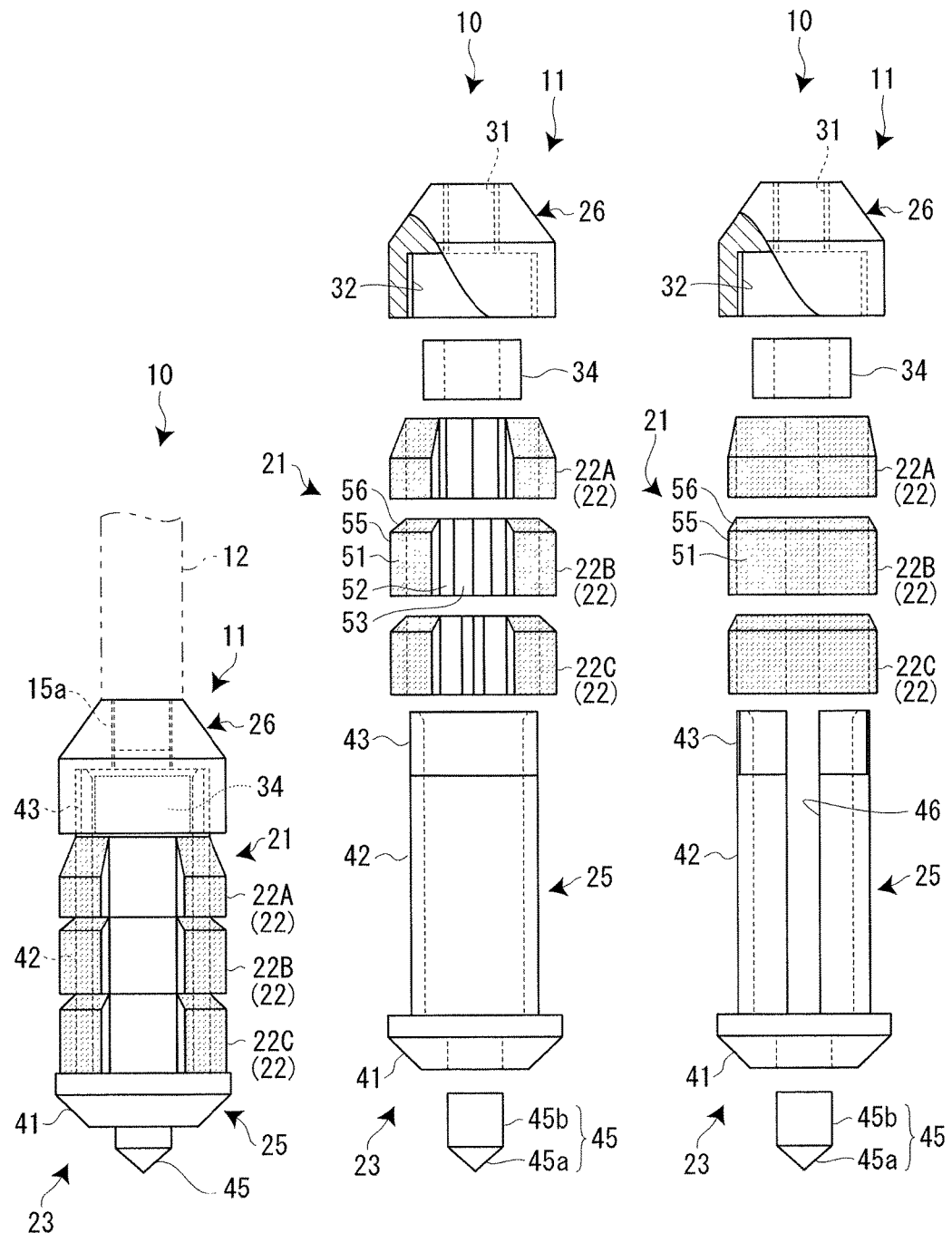
FIGS. 2A to 2C are a structural view of a bit portion in the diameter expansion drill bit according to a first embodiment, a structural view of the bit portion in its exploded state, and a structural view of the bit portion in the developed state when rotated by 90°, respectively.
Figure 3:
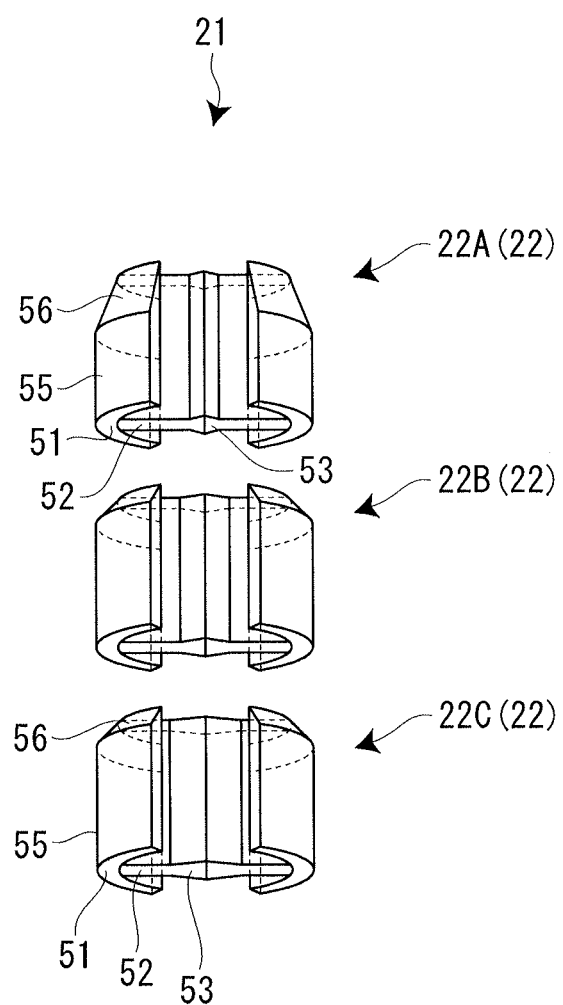
FIG. 3 is an exploded perspective view of a cutting-blade portion of the bit portion.

Next, a description will be given in detail of the bit portion 11 with reference to the enlarged views of FIGS. 2A and 2B. As shown in the figures, the bit portion 11 has a cutting-blade portion 21 formed by a plurality of (six in the embodiment) separate cutting-blade portions 22 for grinding the prepared hole H and a cutting-blade holding portion 23 that movably holds each of the plurality of separate cutting-blade portions 22 in a radial direction. In addition, the plurality of (six) separate cutting-blade portions 22 is arranged (two by two) in a peripheral direction and arranged over a plurality of stages (three stages) in a shaft direction. When the diameter expansion drill bit 10 is rotated with the bit portion 11 inserted in the prepared hole H, the totally six separate cutting-blade portions 22 arranged two by two over the three stages are caused to spread by a centrifugal force to an outside in the radial direction to grind the diameter expansion portion Hb.

The cutting-blade portion 21 has a pair of first separate cutting-blade portions 22A (see FIG. 4A) on a first stage on the side of the shank portion 12, a pair of second separate cutting-blade portions 22B (see FIG. 4B) on a second stage, and a pair of third separate cutting-blade portions 22C (see FIG. 4C) on a third stage on the tip-end side. On the other hand, the cutting-blade holding portion 23 has a holding-portion main-body 25 that holds the cutting-blade portion 21 and a holding-portion receiver 26 on the side of the shank portion 12 with which the holding-portion main-body 25 is threadedly engaged.

The holding-portion receiver 26 has a small-diameter first female-screw portion 31 formed on the base-end side and a large-diameter second female-screw portion 32 formed on the tip-end side. The tip end (a tip-end male-screw portion 15*a*) of the shank portion 12 (the shank main-body 15) is threadedly engaged with the first female-screw portion 31, and the base end of the holding-portion main-body 25 is threadedly engaged with the second female-screw portion 32. In addition, the half portion of the holding-portion receiver 26 on the base-end side is formed into a tapered shape in such a manner as to be largely chamfered. Note that the holding-portion receiver 26 may be integrally formed with the shank portion 12.

The holding-portion main-body 25 has a flange-shaped tip-end flange portion 41, a cylindrically-shaped cylindrical holding portion 42 that is connected to the tip-end flange portion 41 and holds the cutting-blade portion 21, and a cylindrical screw portion 43 connected to the cylindrical holding portion 42. In addition, the holding-portion main-body 25 has a spire portion 45 provided at the tip end of the center of the tip-end flange portion 41 and a plurality of (two) slit portions 46 (cutting-blade opening portions) formed in the areas of the cylindrical holding portion 42 and the cylindrical screw portion 43. Further, the six separate cutting-blade portions 22 constituting the cutting-blade portion 21 are held so as to be parallel to the outer peripheral surface of the holding-portion main-body 25.

The half portion of the tip-end flange portion 41 on the tip-end side is formed into a tapered shape, and the spire portion 45 is attached to the shaft center of this portion. The spire portion 45 is made of, for example, cemented carbide (a cemented carbide material) and integrally formed by a tip-end conical portion 45*a* and a cylindrical portion 45*b* connected to the tip-end conical portion 45*a*. In addition, the cone angle of the tapered portion of the tip-end flange portion 41 is formed to have the same angle as that of the tip-end conical portion 45*a*, and the tip-end conical portion 45*a* is positioned to be an extension of the tapered portion of the tip-end flange portion 41.

The tip-end flange portion 41 is formed to have the largest diameter in the bit portion 11, and the diameter is formed to be slightly smaller (about 0.5 mm) than the prepared hole H. The diameter expansion drill bit 10 of the embodiment is rotated with the spire portion 45 bumped against the hole bottom Ha of the prepared hole H to form the diameter expansion portion Hb at the back part of the prepared hole H. That is, the diameter expansion drill bit 10 is rotated with the tip-end conical portion 45a bumped against the center of the hole bottom Ha to form the diameter expansion portion Hb.

Thus, the tip-end conical portion 45a (the spire portion 45) is brought into point-contact with the center of the hole bottom Ha and can minimize friction with the hole bottom Ha at the rotation. In addition, the abrasion of the spire portion 45 can be minimized since the spire portion 45 is made of cemented carbide. Moreover, the rotational fluctuations of the bit portion 11 (the cutting-blade portion 21) can be minimized by the spire portion 45 and the large-diameter tip-end flange portion 45. Accordingly, the diameter expansion portion Hb can be constantly formed at a prescribed position away from the hole bottom Ha of the prepared hole H. Note that although the spire portion 45 is attached to the tip-end flange portion 41 by welding, shrinkage fitting, or the like, it may be rotatably attached.

The cylindrical screw portion 43 has a male screw on its outer peripheral surface and is formed to have the same diameter as that of the cylindrical holding portion 42. In addition, the two slit portions 46 are formed so as to be cut from the base end of the cylindrical screw portion 43 to the cylindrical holding portion 42. The two slit portions 46 are formed at positions point-symmetrically by 180° in the peripheral direction of the cylindrical holding portion 42 and the cylindrical screw portion 43. Accordingly, the separate cutting-blade portions 22 of the respective stages held by the slit portions 46 are also arranged at positions point-symmetrically by 180° in the peripheral direction. In addition, the separate cutting-blade portions 22 of the respective stages are attached to the cylindrical holding portion 42 in such a manner as to be slid from the base end, i.e., the small cut end of the cylindrical screw portion 43.

Further, the cylindrical screw portion 43 is threadedly engaged with the second female-screw portion 32 of the holding-portion receiver 26 in a state in which the separate cutting-blade portions 22 arranged in pairs over the three stages are attached to the cylindrical holding portion 42. In this state, the separate cutting-blade portions 22 of the three stages held by the cylindrical holding portion 42 are sandwiched between the tip-end flange portion 41 and the holding-portion receiver 26 with a slight gap provided therebetween in the shaft direction.

In this case, there is a likelihood that the first separate cutting-blade portions 22A positioned on the upper stage interfere with the holding-portion receiver 26 having the second female-screw portion 32 when moving in the radial direction. Therefore, the cylindrical screw portion 43 includes a spacer 34 on the inner periphery on the side of the holding-portion receiver 26. The spacer 34 is formed into a cylindrical shape and contacts the base ends of the first separate cutting-blade portions 22A at the cylindrical screw portion 43. That is, the spacer 34 contacts rib portions 52 and coming-off preventing portions 53 (that will be described later) of the first separate cutting-blade portions 22A and constitutes a slight clearance so as to prevent the a cutting-blade main-body 51 (that will be described later) from contacting the cylindrical screw portion 43. Thus, the separate cutting-blade portions 22 are caused to smoothly move in the radial direction by a centrifugal force.

As shown in FIG. 3 and FIGS. 4A to 4C, the separate cutting-blade portions 22 have the cutting-blade main-bodies 51 provided so as to be parallel to the outer peripheral surface of the cutting-blade holding portion 23, the rib portions 52 protruding from the insides of the cutting-blade main-bodies 51, and the expanded coming-off preventing portions 53 (stoppers) provided at the tip ends of the rib portions 52. The cutting-blade main-bodies 51 have a substantially ¼ arc in cross section and a grinding portion 55 at their outer peripheries. In addition, the rib portions 52 slidably engage with the above slit portions 46 in the radial direction. That is, the cutting-blade main-bodies 51 and the coming-off preventing portions 53 are positioned on the outside and the inside of the holding-portion main-body 25 (the cylindrical holding portion 42), respectively. In this state, the rib portions 52 slidably engage with the slit portions 46. Further, the lengths of the rib portions 52 represent the movement strokes of the separate cutting-blade portions 22.

Accordingly, the pair of separate cutting-blade portions 22 of the respective stages held by the holding-portion main body 25 is configured to be capable of spreading by the movement strokes to the outside in the radial direction by a centrifugal force resulting from the rotation. That is, the inner surfaces of the cutting-blade main-bodies 51 contact the outer peripheral surface of the above cylindrical holding portion 42 in the initial state of the spreading, while the outer surfaces of the coming-off preventing portions 53 contact the inner peripheral surface of the cylindrical holding portion 42 in the end state of the spreading (see FIGS. 4A to 4C). However, the grinding of the diameter expansion portion Hb is preferably actually managed based on time (about 10 seconds).

As described above, the cutting-blade portion 21 of the embodiment is constituted by the pair of first separate cutting-blade portions 22A of the first stage, the pair of second separate cutting-blade portions 22B of the second stage, and the pair of third separate cutting-blade portions 22C of the third stage. In this case, the rib portions 52 of the first separate cutting-blade portions 22A, the second separate cutting-blade portions 22B, and the third separate cutting-blade portions 22C are formed to be longer in this order. That is, the cutting-blade portions 22 are formed such that the movement strokes in the radial direction are longer in the order of the first separate cutting-blade portions 22A, the second separate cutting-blade portions 22B, and the third separate cutting-blade portions 22C (see FIGS. 4A to 4C). Thus, the diameter expansion portion Hb is formed into a shape (substantially truncated cone shape) spreading in stages toward the hole bottom Ha (see FIG. 5).

In addition, the first separate cutting-blade portions 22A, the second separate cutting-blade portions 22B, and the third separate cutting-blade portions 22C are formed to have a tapered guide portion 56 at their outer peripheral surfaces on the base-end side. The guide portions 56 of the first separate cutting-blade portions 22A are formed to be larger, while the guide portions 56 of the second separate cutting-blade portions 22B and the third separate cutting-blade portions 22C are formed to be smaller and the same. When the diameter expansion drill bit 10 is pulled out from the prepared hole H after the formation of the diameter expansion portion Hb, the separate cutting-blade portions 22 are setback to their initial positions by the guide portions 56 to allow the diameter expansion drill bit 10 to be smoothly pulled out.

The cutting-blade main-bodies 51 are constituted by diamond cutting blades having an arc shape in cross section. That is, the cutting-blade main-bodies 51 have the diamond grinding portion 55 at their outer peripheries, besides the above guide portion 56. Thus, the inner peripheral surface of the prepared hole H is ground toward the outside to form the diameter expansion portion Hb of a prescribed size. Note that the inner surfaces of the cutting-blade main-bodies 51 may have a weight or the like such that a strong centrifugal force is applied to the separate cutting-blade portions 22.

Figure 4A:
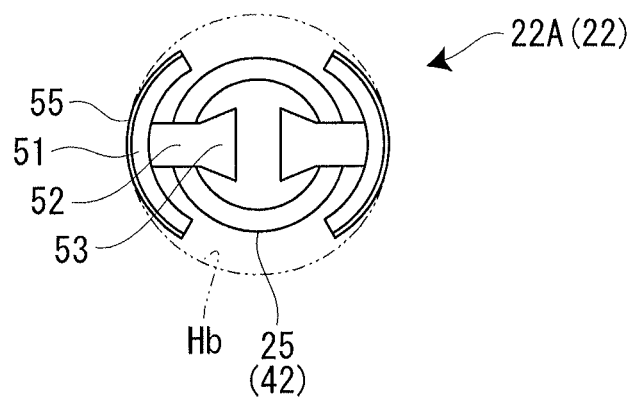
FIGS. 4A to 4C are explanatory views showing the spreading state of the separate cutting-blade portions of respective stages of the bit portion.
Figure 4B:
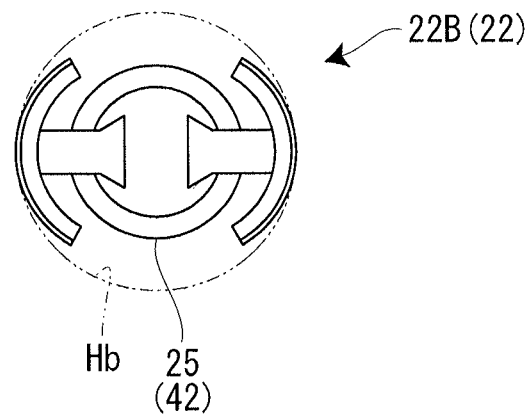
Figure 4C:
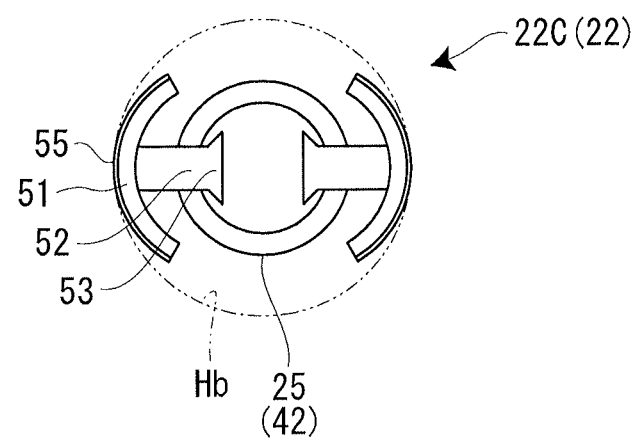

Since the cutting-blade main-bodies 51 have an arc shape, their actual grinding portions shift from an entire arc-shaped peripheral surface to a middle part as the spreading advances (see FIGS. 4A to 4C). That is, since the frictional resistance of the cutting-blade main-bodies 51 becomes smaller as the grinding advances, the grinding can be smoothly advanced. However, it may be possible that the arc-shaped outer peripheral portions of the cutting-blade main-bodies 51 have an arc having a larger curvature than that of an arc relative to the rotation center of the cutting-blade holding portion 23. In addition, the tip-ends of the cutting-blade main-bodies 51 in the peripheral direction (the tip ends in the rotation direction) are preferably chamfered in order to reduce grinding resistance at the beginning of the grinding.

Figures 5A, 5B:
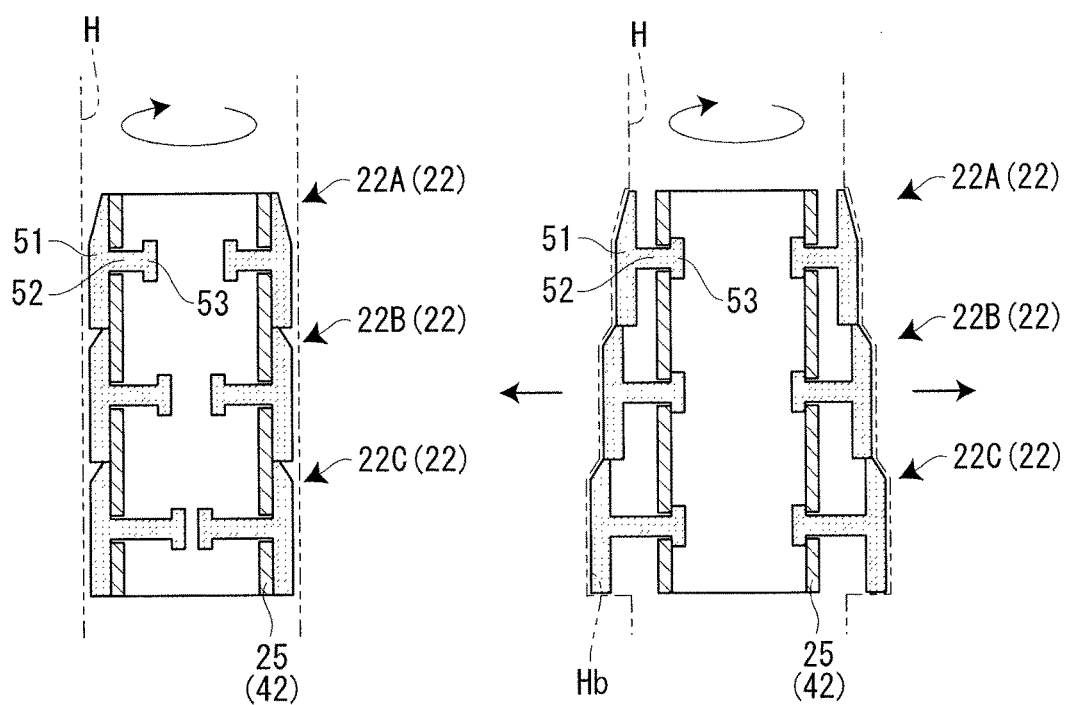
FIGS. 5A and 5B are schematic cross-sectional views showing the bit portion and a diameter expansion portion formed by the bit portion in the first embodiment.

Next, a description will be given, with reference to FIG. 1 and FIGS. 5A and 5B, of the operation of expanding the diameter of the prepared hole H with the diameter expansion drill bit 10. In the diameter expansion operation, it is assumed that the prepared hole H is formed in advance in a target concrete frame A or the like. Note that in this case, the concrete frame A includes a base, a beam, or the like, besides an exterior wall, an interior wall, and a slab made of concrete.

In the diameter expansion operation, the diameter expansion drill bit 10 attached to the diameter expansion device 1 is first inserted in the prepared hole H so as to cause the spire portion 45 of the bit portion 11 to be bumped against the hole bottom Ha of the prepared hole H. Subsequently, the electric drill 2 is driven to rotate the diameter expansion drill bit 10. When the diameter expansion drill bit 10 rotates, a centrifugal force is applied to the six separate cutting-blade portions 22, whereby the separate cutting-blade portions 22 spread to the outside (see FIGS. 5A and 5B). Thus, the grinding portions 55 of the rotating cutting-blade main-bodies 55 grind the inner surface of the prepared hole H to form the diameter expansion portion Hb at the back part of the prepared hole H.

In this case, the cutting-blade portion 21 is formed such that the movement strokes in the radial direction are longer in the order of the first separate cutting-blade portions 22A, the second separate cutting-blade portions 22B, and the third separate cutting-blade portions 22C. Therefore, the diameter expansion portion Hb is formed into a shape (substantially truncated cone shape) spreading in stages. Note that although the cooling liquid is supplied during the formation of the diameter expansion portion Hb, it washes the prepared hole H and leaks out from the slit portions 46 to accelerate the spreading of the separate cutting-blade portions 22 besides cooling the cutting-blade portion 21. That is, the cooling liquid to which a centrifugal force is applied presses the separate cutting-blade portions 22 in such a manner as to scatter radially, and the cooling liquid attached to the slit portions 46 functions as a lubricant and accelerates the spreading of the separate cutting-blade portions 22.

As described above, according to the first embodiment, the cutting-blade portion 21 is formed such that the movement strokes in the radial direction are longer in the order of the first separate cutting-blade portions 22A, the second separate cutting-blade portions 22B, and the third separate cutting-blade portions 22C. Therefore, the diameter expansion portion Hb can be easily formed into a substantially truncated cone shape. In addition, the separate cutting-blade portions 22 are caused to spread by a centrifugal force. Therefore, the configuration of the device can be simplified.

Note that the cylindrical holding portion 42 and the holding-portion receiver 26 may be integrally formed and the tip-end flange portion 41 may be threadedly engaged with the cylindrical holding portion 42. In addition, the number of the separate cutting-blade portions 22 of the respective stages may be three or more, and the number of the stages of the separate cutting-blade portions 22 may be four or more.

Figure 6A:
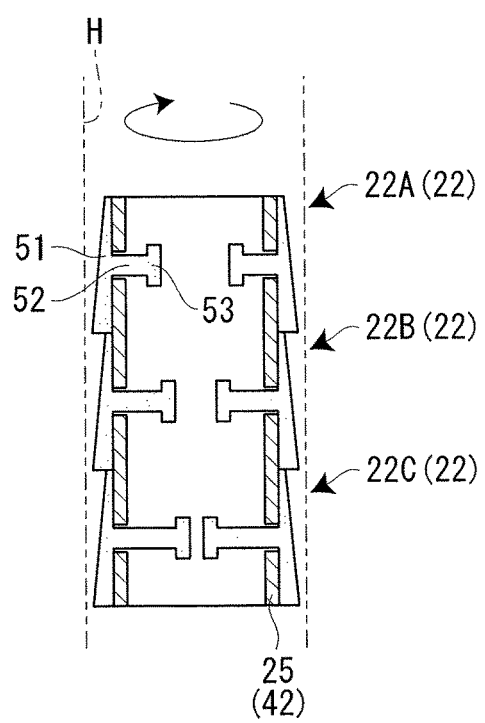
FIGS. 6A and 6B are schematic cross-sectional views showing a bit portion and a diameter expansion portion formed by the bit portion in a second embodiment.
Figure 6B:
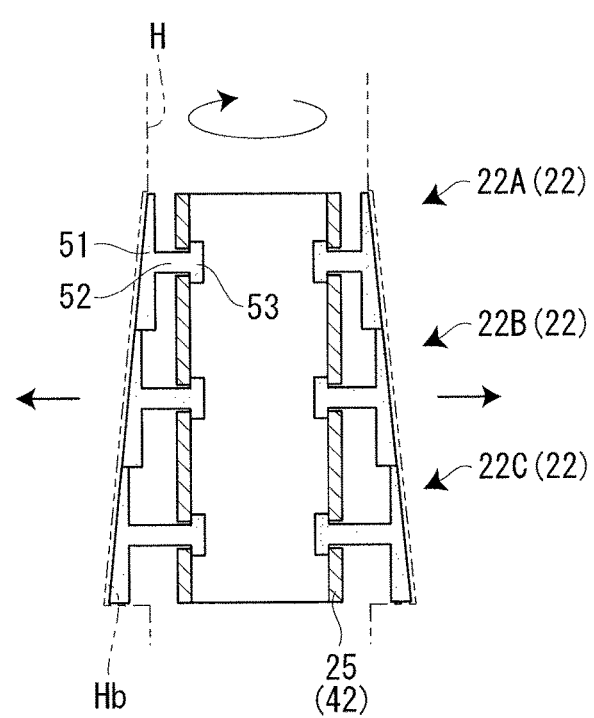

Next, a description will be given, with reference to FIGS. 6A and 6B, of a diameter expansion drill bit 10 according to a second embodiment focusing mainly on the difference between the first and second embodiments.

As shown in the figures, two separate cutting-blade portions 22 of the respective stages of a bit portion 11 are formed into a tapered shape following the tapered shape of a formed diameter expansion portion Hb in the diameter expansion drill bit 10. That is, cutting-blade main-bodies 51 of first separate cutting-blade portions 22A are formed into a shape following the tapered shape of the upper stage of the diameter expansion portion Hb, cutting-blade main-bodies 51 of second separate cutting-blade portions 22B are formed into a shape following the tapered shape of the middle stage of the diameter expansion portion Hb, and cutting-blade main-bodies 51 of third separate cutting-blade portions 22C are formed into a shape following the tapered shape of the lower stage of the diameter expansion portion Hb.

Further, as in the first embodiment, a cutting-blade portion is formed such that the movement strokes in a radial direction are longer in the order of the first separate cutting-blade portions 22A, the second separate cutting-blade portions 22B, and the third separate cutting-blade portions 22C. That is, rib portions 52 of the first separate cutting-blade portions 22A, the second separate cutting-blade portions 22B, and the third separate cutting-blade portions 22C are formed to be longer in this order.

In the diameter expansion drill bit 10 according to the second embodiment described above, each of the first separate cutting-blade portions 22A, the second separate cutting-blade portions 22B, and the third separate cutting-blade portions 22C performs a grinding operation. As a result, the diameter expansion portion Hb can be formed into a truncated cone shape as a whole. In addition, since the separate cutting-blade portions 22 are formed into a tapered shape, the above guide portions 56 can be omitted.

Next, a description will be given, with reference to FIGS. 7A and 7B, of a diameter expansion drill bit 10 according to a third embodiment focusing mainly on the difference between the first and third embodiments.

As shown in the figures, two separate cutting-blade portions 22 of respective stages of a bit portion 11 have the same movement stroke in a radial direction in the diameter expansion drill bit 10. That is, rib portions 52 of first separate cutting-blade portions 22A, second separate cutting-blade portions 22B, and third separate cutting-blade portions 22C are formed to have the same length.

In the diameter expansion drill bit 10 according to the third embodiment described above, each of the first separate cutting-blade portions 22A, the second separate cutting-blade portions 22B, and the third separate cutting-blade portions 22C performs a grinding operation. As a result, a diameter expansion portion Hb can be formed into a substantially cylindrical shape as a whole.

Figures 8A, 8B:
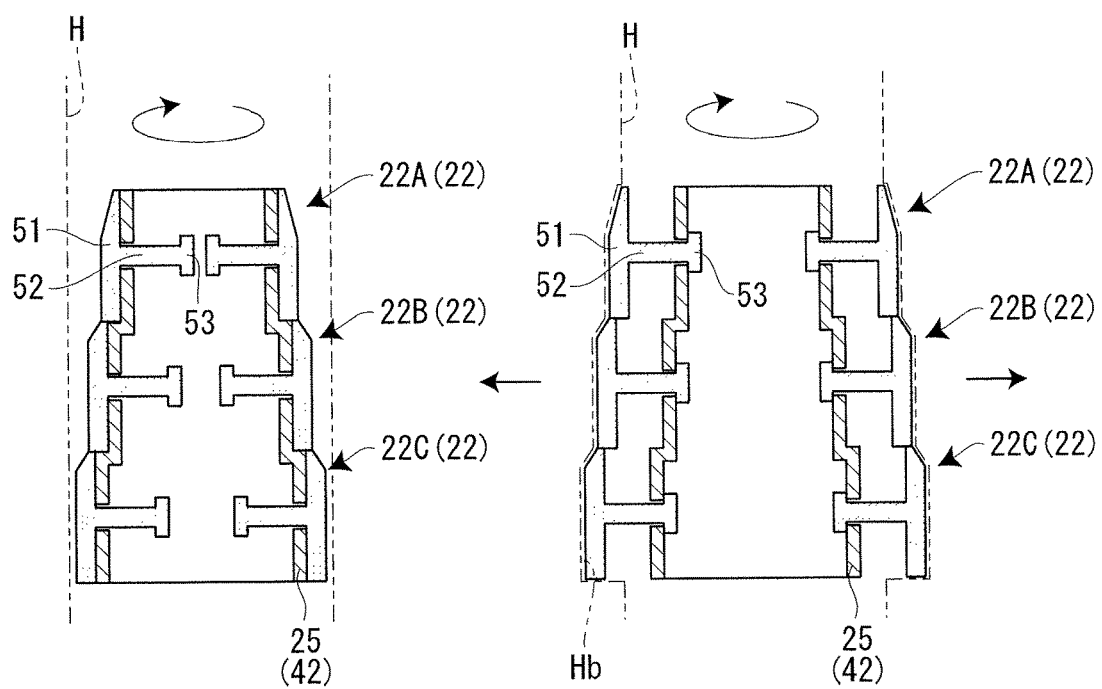
FIGS. 8A and 8B are schematic cross-sectional views showing a bit portion and a diameter expansion portion formed by the bit portion in a fourth embodiment.

Next, a description will be given, with reference to FIGS. 8A and 8B, of a diameter expansion drill bit 10 according to a fourth embodiment focusing mainly on the differences between the first and fourth embodiments.

As shown in the figures, a cutting-blade holding portion 23 (a cylindrical holding portion 42) of a bit portion 11 is formed into a shape spreading in stages toward its tip end in the diameter expansion drill bit 10. On the other hand, as in the third embodiment, rib portions 52 of first separate cutting-blade portions 22A, second separate cutting-blade portions 22B, and third separate cutting-blade portions 22C are formed to have the same length.

In the diameter expansion drill bit 10 according to the fourth embodiment described above, each of the first separate cutting-blade portions 22A, the second separate cutting-blade portions 22B, and the third separate cutting-blade portions 22C performs a grinding operation. As a result, a diameter expansion portion Hb can be formed into a substantially truncated cone shape as a whole.

Figures 9A, 9B:
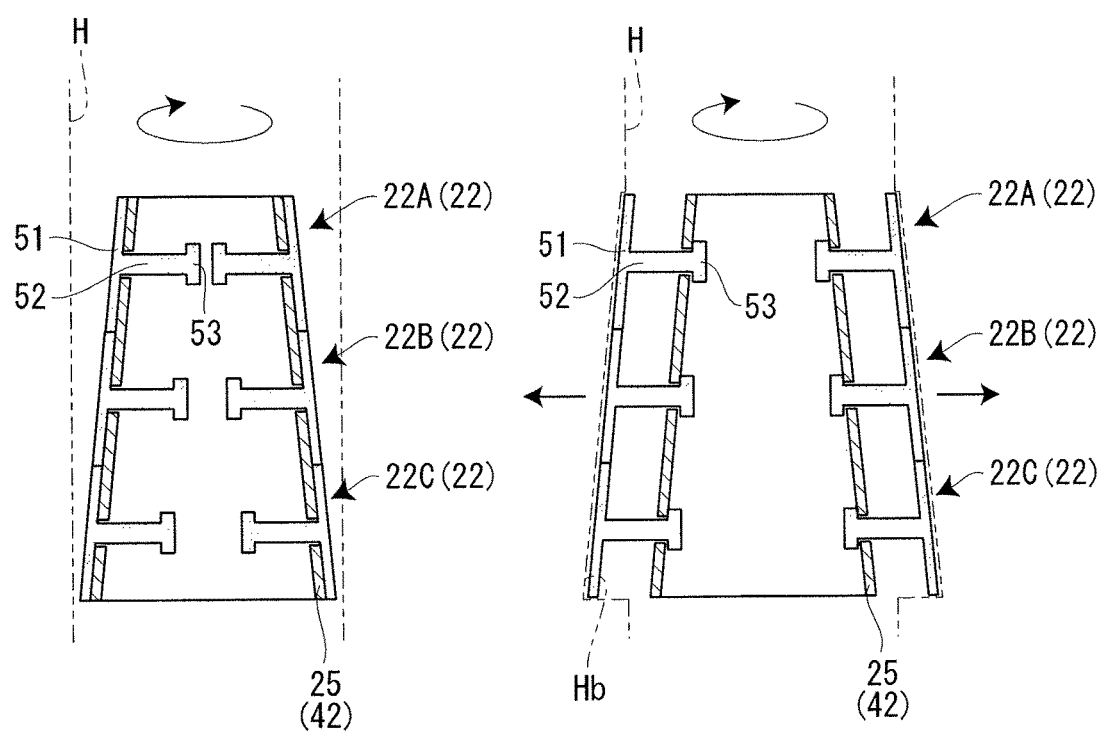
FIGS. 9A and 9B are schematic cross-sectional views showing a bit portion and a diameter expansion portion formed by the bit portion in a fifth embodiment.

Next, a description will be given, with reference to FIGS. 9A and 9B, of a diameter expansion drill bit 10 according to a fifth embodiment focusing mainly on the differences between the first and fifth embodiments.

As shown in the figures, a cutting-blade holding portion 23 (a cylindrical holding portion 42) of a bit portion 11 is formed into a tapered shape spreading toward its tip end in the diameter expansion drill bit 10. In addition, respective separate cutting-blade portions 22 have a grinding portion 55 having a tapered angle following the tapered angle of the cutting-blade holding portion 23. That is, as in the second embodiment, the two separate cutting-blade portions 22 of respective stages are formed into a tapered shape following the tapered shape of a formed diameter expansion portion Hb. Also in this case, rib portions 52 of first separate cutting-blade portions 22A, second separate cutting-blade portions 22B, and third separate cutting-blade portions 22C are formed to have the same length.

In the diameter expansion drill bit 10 according to the fifth embodiment described above, each of the first separate cutting-blade portions 22A, the second separate cutting-blade portions 22B, and the third separate cutting-blade portions 22C performs a grinding operation. As a result, as in the second embodiment, the diameter expansion portion Hb can be formed into a substantially truncated cone shape as a whole.

Figures 10A, 10B:
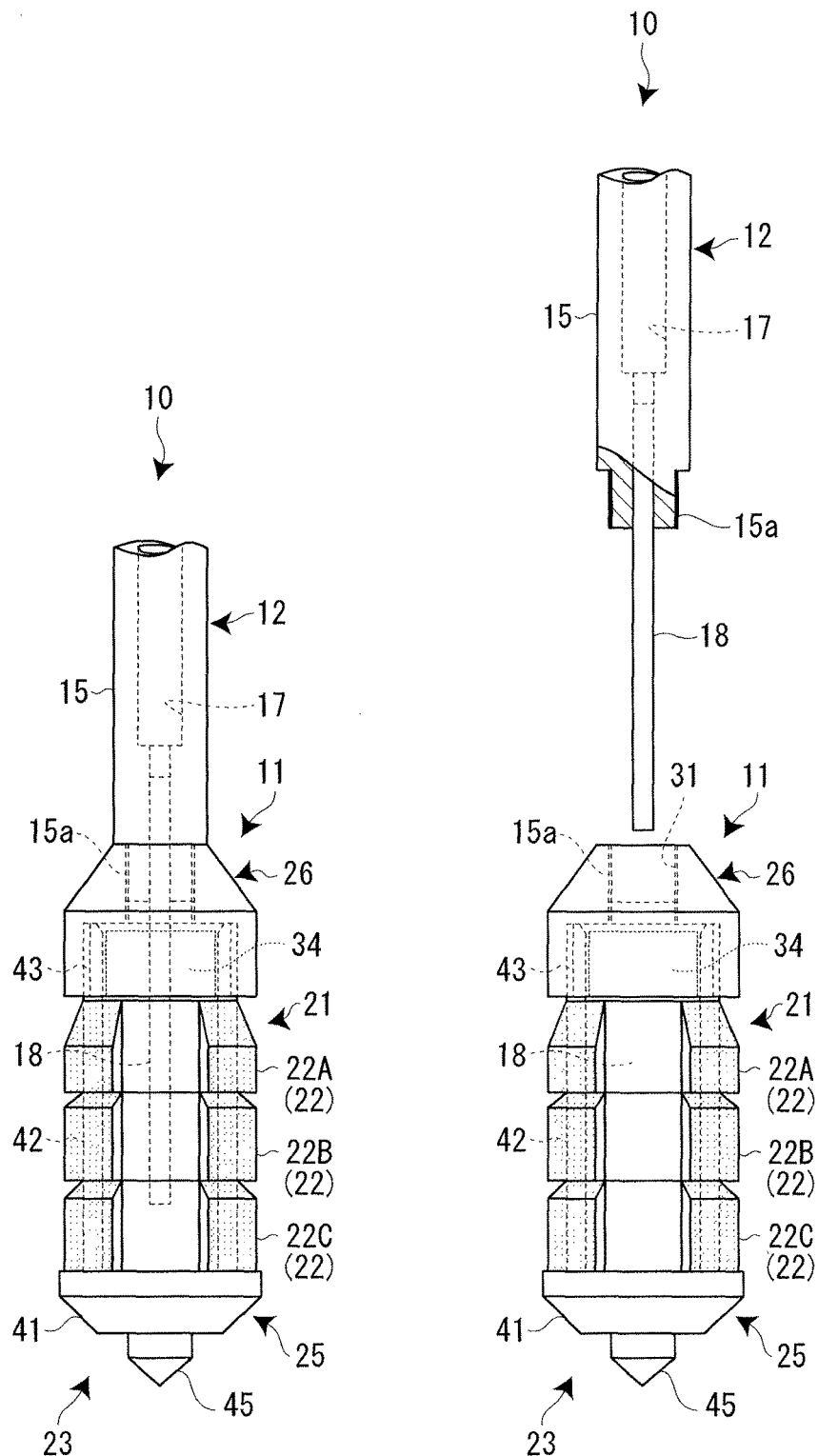
FIGS. 10A and 10B are a structural view of the shank portion and the bit portion of a diameter expansion drill bit according to a sixth embodiment and a structural view showing a state in which the shank portion and the bit portion are separated, respectively.

Next, a description will be given, with reference to FIGS. 10A and 10B, of a diameter expansion drill bit 10 according to a sixth embodiment focusing mainly on the difference between the first and sixth embodiments.

As shown in the figures, a cooling-liquid pipe 18 (coolant pipe) connected to an intra-shank flow path 17 is provided at the tip end of a shank portion 12 in the diameter expansion drill bit 10. That is, the shank portion 12 of the sixth embodiment has a shank main-body 15 having the intra-shank flow path 17 and the cooling-liquid pipe 18 communicating with the intra-shank flow path 17 and extending from the tip end of the shank main-body 15 to a position corresponding to third separate cutting-blade portions 22 of a cutting-blade holding portion 23.

The shank main-body 15 has the intra-shank flow path 17 at its shaft center, and the tip end of the intra-shank flow path 17 is slightly narrowed in diameter. The cooling-liquid pipe 18 is attached to the tip end of the intra-shank flow path 17 (the shank main-body 15). In this case, the cooling-liquid pipe 18 is made of stainless steel or the like and is attached to the shank main-body 15 (the intra-shank flow path 17) at its base end by press-fitting or the like. Note that it is more preferable to prepare the cooling-liquid pipe 18 having an inner diameter the same as the diameter of the tip end of the intra-shank flow path 17, expand the diameter of the tip end of the intra-shank flow path 17 so as to correspond to the outer diameter of the cooling-liquid pipe 18, and press-fit the cooling-liquid pipe 18 into the expanded tip end. Note that rib portions 52 of separate cutting-blade portions 22 of the sixth embodiment are, of course, formed to be shorter by half the radius of the cooling-liquid pipe 18.

In such a configuration, a cooling liquid is discharged from the tip end of the cooling-liquid pipe 18 into the cutting-blade holding portion 23. The cooling liquid discharged from the cooling-liquid pipe 18 flows through a prepared hole H toward an opening portion in the order of the third separate cutting-blade portions 22C, second separate cutting-blade portions 22B, and first separate cutting-blade portions 22A via slit portions 46. Thus, since the cooling liquid smoothly flows through the prepared hole H, the respective separate cutting-blade portions 22 can be efficiently cooled.

Note that the shank main-body 15 and the cooling-liquid pipe 18 may be integrally formed. In addition, small holes may be appropriately bored in the peripheral wall surface of the cooling-liquid pipe 18. For example, it may be possible to bore small holes so as to correspond to the second separate cutting-blade portions 22B and the first separate cutting-blade portions 22A and accelerate the spreading of the respective separate cutting-blade portions 22 with the cooling liquid to which a centrifugal force is applied.

1 Boring device
2 Electric drill
3 Cooling-liquid attachment
10 Diameter expansion drill bit
11 Bit portion
12 Shank portion
15 Shank main-body
17 Intra-shank flow path
18 Cooling-liquid pipe
21 Cutting-blade portion
22 Separate cutting-blade portion
22A First separate cutting-blade portion
22B Second separate cutting-blade portion
22C Third separate cutting-blade portion
23 Cutting-blade holding portion
25 Holding-portion main-body
26 Holding-portion receiver
41 Tip-end flange portion
42 Cylindrical holding portion
43 Cylindrical screw portion
45 Spire portion
46 Slit portion
51 Cutting-blade main-body
52 Rib portion
53 Coming-off preventing portion
55 Grinding portion
56 Guide portion
A Concrete frame
H Prepared hole
Ha Hole bottom
Hb Diameter expansion portion

What is claimed is:

1. A diameter expansion drill bit inserted for use in a prepared hole bored in a frame and used to expand a diameter of a part of the prepared hole by grinding, the diameter expansion drill bit comprising:
   a cutting-blade portion that has a plurality of separate cutting-blade portions used to grind the part of the prepared hole;
   a cutting-blade holding portion that slidably holds the plurality of separate cutting-blade portions in a radial direction; and a shank portion that supports the cutting-blade holding portion, wherein
the plurality of separate cutting-blade portions is arranged in a peripheral direction and arranged over a plurality of stages in a shaft direction,
the plurality of separate cutting-blade portions of the respective stages is caused to slide by a centrifugal force resulting from rotation so as to spread to an outside in the radial direction with respect to the cutting-blade holding portion, and
the plurality of separate cutting-blade portions of the respective stages has different movement strokes in the radial direction.

2. The diameter expansion drill bit according to claim 1, wherein
the movement strokes of the respective stages are set to be longer in stages toward a tip end.

3. The diameter expansion drill bit according to claim 1, wherein
the plurality of separate cutting-blade portions of the respective stages has the same movement stroke in the radial direction.

4. The diameter expansion drill bit according to claim 1, wherein
the respective separate cutting-blade portions have a guide portion, which guides pulling of the diameter expansion drill bit from a diameter expansion portion formed in the prepared hole, at an outer peripheral surface on a base-end side thereof.

5. The diameter expansion drill bit according to claim 1, wherein
the cutting-blade holding portion has a spire portion, which protrudes coaxially with the cutting-blade holding portion, at a tip end thereof, and
the spire portion is made of a cemented carbide material.

6. The diameter expansion drill bit according to claim 1, wherein
the cutting-blade holding portion has a plurality of cutting-blade opening portions that slidably holds the plurality of separate cutting-blade portions of the respective stages, and
the respective separate cutting-blade portions have
a cutting-blade main-body that includes a grinding portion having an arc shape in cross section,
a rib portion that supports the cutting-blade main-body and slidably engages with the cutting-blade opening portion in the radial direction, and
a coming-off preventing portion that is provided at the rib portion and prevents the rib portion from coming off the cutting-blade opening portion.

7. The diameter expansion drill bit according to claim 1, wherein
the plurality of separate cutting-blade portions of the respective stages is constituted by the two separate cutting-blade portions arranged at positions point-symmetrically by 180°.

8. The diameter expansion drill bit according to claim 1, wherein
the shank portion has
a shank main-body that has an intra-shank flow path used to supply a coolant to the cutting-blade portions via the cutting-blade holding portion and
a coolant pipe that communicates with the intra-shank flow path and extends from a tip end of the shank main-body to a position corresponding to the plurality of separate cutting-blade portions of a tip-end stage of the cutting-blade holding portion.

9. A diameter expansion drill bit inserted for use in a prepared hole bored in a frame and used to expand a diameter of a part of the prepared hole by grinding, the diameter expansion drill bit comprising:
a cutting-blade portion that has a plurality of separate cutting-blade portions used to grind the part of the prepared hole;
a cutting-blade holding portion that slidably holds the plurality of separate cutting-blade portions in a radial direction; and
a shank portion that supports the cutting-blade holding portion, wherein
the plurality of separate cutting-blade portions is arranged in a peripheral direction and arranged over a plurality of stages in a shaft direction,
the plurality of separate cutting-blade portions of the respective stages is caused to slide by a centrifugal force resulting from rotation so as to spread to an outside in the radial direction with respect to the cutting-blade holding portion,
the plurality of separate cutting-blade portions of the respective stages has the same movement stroke in the radial direction, and
the cutting-blade holding portion is formed into a shape spreading toward a tip end thereof.

* * * * *